Figure 1:
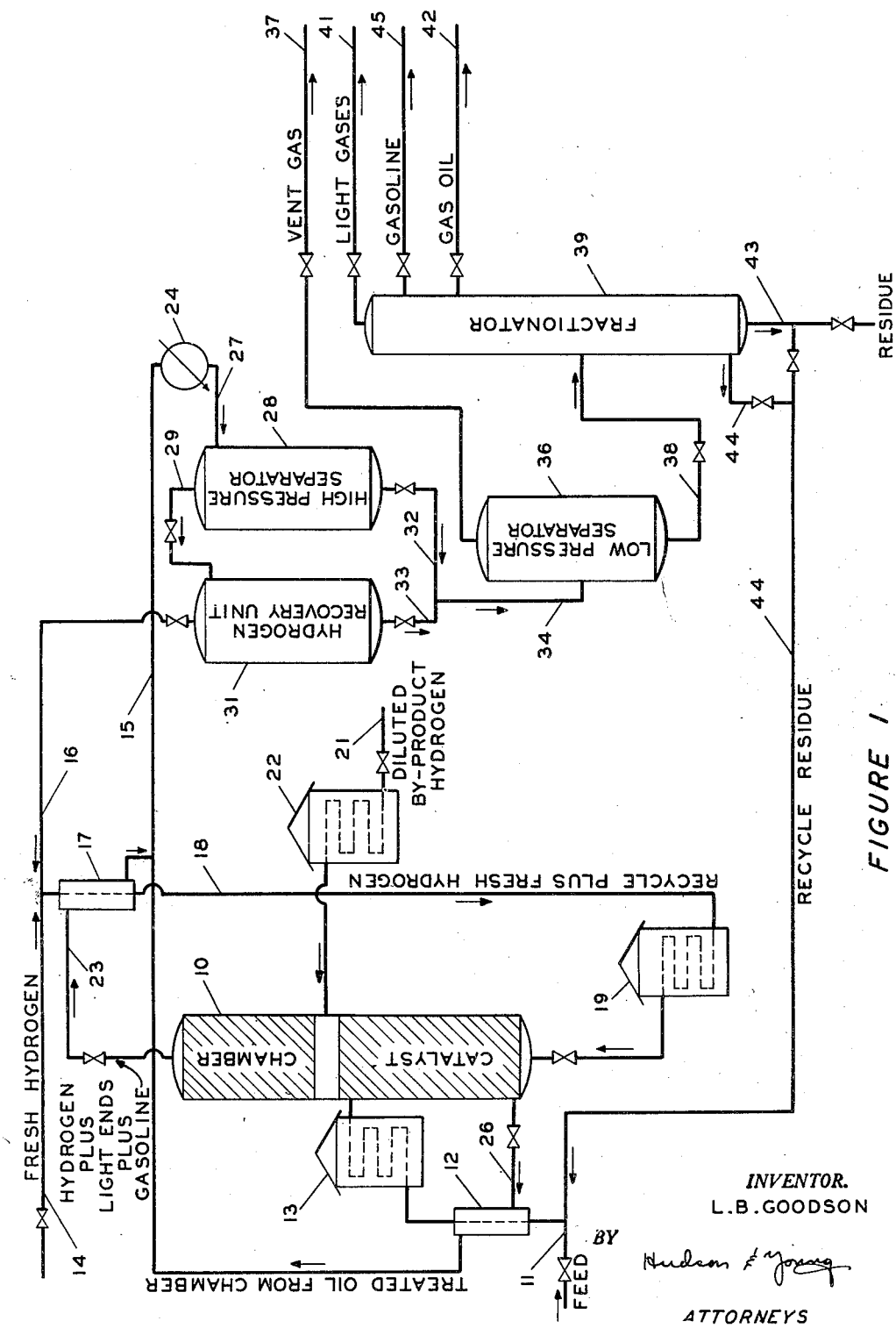

Feb. 13, 1951 L. B. GOODSON 2,541,237
HYDROGENOLYSIS PROCESS FOR THE PRODUCTION OF
GASOLINE AND A GAS OIL FROM RESIDUAL OILS
Filed Dec. 2, 1947 2 Sheets-Sheet 1

INVENTOR.
L. B. GOODSON
BY
Hudson & Young
ATTORNEYS

Patented Feb. 13, 1951

2,541,237

UNITED STATES PATENT OFFICE 2,541,237

HYDROGENOLYSIS PROCESS FOR THE PRODUCTION OF GASOLINE AND A GAS OIL FROM RESIDUAL OILS

Luke B. Goodson, Bartlesville, Okla., assignor to Phillips Petroleum Company, a corporation of Delaware Application December 2, 1947, Serial No. 789,223

4 Claims. (Cl. 196—53)

This invention relates to an improved process of hydrogenolysis. In one of its more specific aspects it relates to a novel manner of introducing hydrogen to a hydrogenolysis process.

The term hydrogenolysis as used in this invention, means destructive hydrogenation wherein cracking and hydrogenation reactions are taking place simultaneously. Hydrogenolysis, as distinguished from hydrogenation wherein the simple addition of hydrogen to unsaturated bonds takes place, is cracking under hydrogenating conditions so that the products of the cracking reaction are substantially more saturated than when hydrogen or materials supplying hydrogen are not present.

Hydrogenolysis processes are most commonly employed on coals and heavy residual or distillate oils for the production of substantial yields of low-boiling saturated products such as gasoline, intermediate distillates which may be utilized as domestic fuels and, to some extent, still heavier cuts suitable for use as lubricants. These destructive hydrogenation processes may be operated on a strictly thermal basis or in the presence of catalysts.

The art discloses processes for the hydrogenolysis of residual oils in which hydrogen is introduced at one or more points in a catalyst chamber. In all of these processes stress is laid on the use of high purity hydrogen. My invention makes direct use of by-product hydrogen without purification. In addition, most of the processes utilize concurrent or countercurrent contacting. One embodiment of my invention uses both concurrent and countercurrent flow in the same chamber, utilizing the best aspects of each to produce a better quality gasoline without impairing the properties of the by-product gas oil. This is accomplished by using different catalyst zones and controlling the partial pressure on concentration of hydrogen in said zones more or less independently of each other.

An object of the present invention is a novel and improved method of hydrogenolysis.

Another object is the manufacture of a high-quality gasoline.

Another object is the production of a high-quality gasoline, and a good quality gas oil and a paraffinic type residue in a single hydrogenolysis step.

Another object is the catalytic hydrogenolysis of a total feed stock with catalytic reforming of the gasoline range hydrocarbons.

Another object is the effective separation by gravity and by stripping of the liquid and vapor portions of the reactor effluent within the reactor.

Another object is to contact countercurrently and concurrently a material to be treated with hydrogen in a one step process of hydrogenolysis.

A further object is to preheat the hydrogen to be introduced to the reaction chamber of a hydrogenolysis process to reaction temperature, thus aiding in the maintenance of the contact chamber at reaction temperature.

Another object is to reduce the volume of hydrogen required without reducing the yield of gasoline.

Other objects and advantages of this invention will become apparent from the accompanying disclosure and discussion.

In accordance with a preferred embodiment of this invention, a refinery residual oil such as reduced topped crude, fuel oil, tar, etc., is passed through heating equipment and introduced at the top of a first catalyst zone, and relatively pure hot hydrogen is introduced at the bottom of said first catalyst zone, contacting the oil charge countercurrently under conditions of destructive hydrogenation. Thus the residual oil is treated in a first catalyst zone, and a saturated paraffinic gas oil recovered through an outlet near the bottom of the zone. Because of the purity of the hydrogen in this catalyst zone the gas oil recovered is saturated which is a desired property. The light ends and gasoline fraction are passed to a second catalyst zone where they are contacted concurrently with diluted hydrogen, e. g. by-product hydrogen, under reforming conditions. Due to the diluted condition of the hydrogen in the second catalyst zone the velocity of the cracking reaction exceeds that of the hydrogenation reaction, however, at the same time, sufficient hydrogen is present to prevent coking. By controlling the dilution of the hydrogen, any combination of saturated and unsaturated compounds may be produced. The same or different catalysts may be used in the different zones as desired.

In a second embodiment of this invention, a refinery residual oil is passed through heating equipment and introduced at the top of a catalyst zone where it is contacted countercurrently under destructive hydrogenation conditions, first with relatively pure hydrogen, producing saturated compounds, and second with diluted hydrogen, producing unsaturated compounds. As in the first embodiment, by controlling the dilution of the hydrogen any combination of saturated and unsaturated compounds may be produced. In addition, the process described in this invention, reduces the volume of hydrogen required, making for economy, and utilizes by-product hydrogen without purification.

A more clear understanding of some of the many aspects of this invention may be had by referring to the attached schematic flow diagrams.

As shown in Figure 1, the refinery residual oil is introduced to the lower portion of catalyst chamber 10, through line 11, heat exchanger 12, and heater 13 at a temperature between 850 to 950° F. Fresh hydrogen, plus recycle hydrogen of 95-98 per cent or better purity, is introduced at the bottom of catalyst chamber 10 through lines 14 and 16, heat exchanger 17, line 18, and heater 19. Dilute by-product hydrogen is introduced to catalyst chamber 10 slightly below the upper portion of the catalyst bed, but above the point of introduction of the fuel oil charge, through line 21, and heater 22. In this manner, the top portion of the catalyst bed is contacted with dilute hydrogen alone. The gasoline and light ends formed in the lower portion of the catalyst chamber are stripped up through the top portion of the catalyst bed where they are reformed in the presence of dilute hydrogen. These reformed materials are then removed from catalyst chamber 10, through line 23, heat exchanger 17, and line 15, to cooler 24. The gas oil and heavier materials produced in the lower portion of the catalyst bed are removed from catalyst chamber 10 through an outlet near the bottom of the chamber through line 26, heat exchanger 12, and line 15, to cooler 24. From cooler 24 the products of the process are passed through line 27 to high pressure separator 28. In high pressure separator 28, hydrogen and light gases are separated and passed through line 29 to hydrogen recovery unit 31 where hydrogen of 95 to 98 per cent purity is separated for recycle. The residue materials from high pressure separator 28 and hydrogen recovery unit 31 are passed through lines 32 and 33 respectively, and line 34 to low pressure separator 36. In low pressure separator 36, vent gases are separated and removed through line 37, and the residue is passed through line 38 to fractionator 39. In fractionator 39, a light gas fraction is separated and removed through line 41, a gasoline fraction is separated and removed through line 45, a gas oil fraction is separated and removed through line 42, a recycle fraction is removed through line 44, and a residue is removed through line 43 for recycle through line 44 to catalyst chamber 10 and/or recovered as a by-product of the process.

In some cases it may be desirable and advantageous to carry out the recovery and fractionation of the gasoline and light ends in equipment separate from that used for the heavier oils, thereby making possible more efficient fractionation than is possible in those processes where the entire catalyst chamber effluent is charged to one fractionating tower. Therefore, if desired, the gasoline and light ends removed from the top of catalyst chamber 10, through line 23, and heat exchanger 17, may be taken through a line, other than line 15, to a separatory and hydrogen recovery system, and a fractionation system, separate from that used for the heavier oils taken from the bottom of said catalyst chamber 10 through line 26. This additional recovery apparatus is omitted from the schematic drawing given in Figure 1 for the sake of clarity and simplicity.

General operating conditions are as follows: The temperature of the lower portion of the catalyst chamber is maintained within the range of 850 to 950° F. and in the upper portion of the catalyst chamber at 950 to 1050° F. The pressure within the catalyst chamber should be maintained within the range of 3000 to 5000 pounds per square inch gauge. The velocity of the 95 per cent, or better, hydrogen through the catalyst voids should be in the range of 0.1 to 0.25 foot per second. The oil charge rate should be maintained at 0.5 to 2.0 volumes of oil per volume of catalyst per hour. The concentration of the diluted hydrogen introduced just below the upper portion of the catalyst bed should be in the range of 10 to 75 per cent hydrogen. These operating conditions may necessarily be changed, depending on the feed stock to be treated, and the desired properties of the product gasoline and by-product gas oil.

Figure 2:
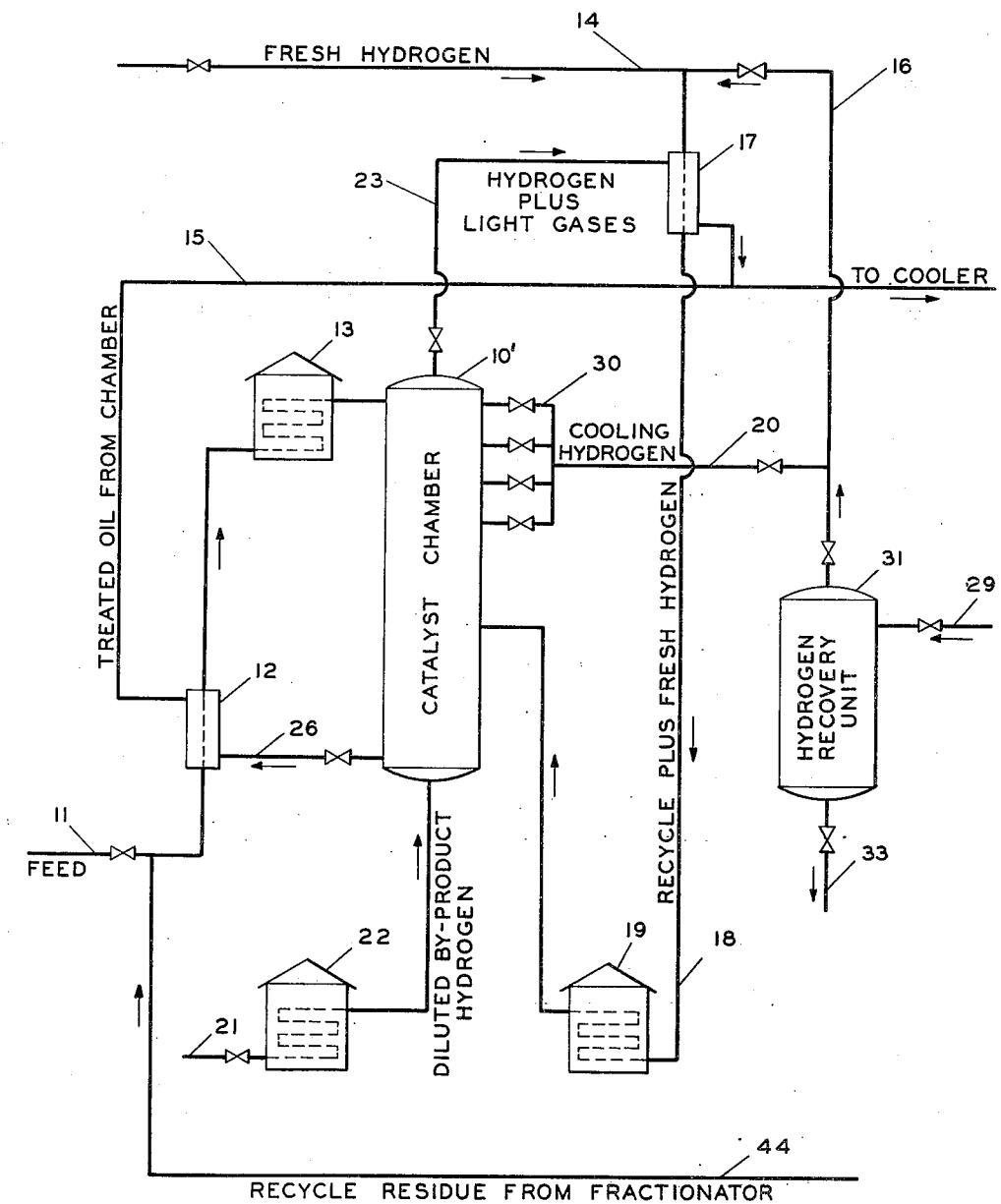

In a second embodiment, as shown in Figure 2, a residual oil is introduced at the top of catalyst chamber 10', through line 11, heat exchanger 12, and heater 13 at a temperature in the range of 800 to 975° F. and a pressure in the range of 3000 to 5000 pounds per square inch gauge. Diluted hydrogen is introduced at the bottom of catalyst chamber 10' through line 21 and heater 22. Recycled hydrogen and fresh hydrogen are introduced to catalyst chamber 10' between one-half and one-quarter, but preferably at one-third, of the total length of the catalyst bed from the bottom through lines 14 and 16, heat exchanger 17, line 18, and heater 19. If desired, a portion of the recycled hydrogen may be introduced to catalyst chamber 10' through lines 16 and 20, and header apparatus 30 to act as a temperature control. The oil to be treated is contacted countercurrently, first with relatively pure hydrogen, and then with diluted by-product hydrogen. The treated oil is removed from catalyst chamber 10' through line 26, heat exchanger 12, and line 15 to cooler 24 (not shown). The hydrogen and light gases are removed from the top of catalyst chamber 10' through line 23, heat exchanger 17, and line 15 to cooler 24 (not shown). From cooler 24 the materials are treated as described in the first embodiment shown in Figure 1.

The lower portion of the catalyst bed is contacted with diluted hydrogen only, thus making the cracking reaction velocity exceed that of the hydrogenation reaction. The hydrogen concentration in the lower portion of the catalyst bed is reduced to about one-half or one-fourth that in the upper portion of the bed so that there is not sufficient hydrogen present to allow the hydrogenation reaction to go to completion. However, there is sufficient hydrogen present to prevent the formation of coke which usually accompanies cracking reactions.

General operating conditions are as follows: Temperature of the catalyst chamber should be maintained within the range of 800 to 975° F. The pressure within the catalyst chamber should be maintained within the range of 3000 to 5000 pounds per square inch gauge. The velocity of the hydrogen throughout the catalyst voids should be in the range of about 0.1 foot per second. The oil charge rate should be maintained at 0.5 to 2.0 volumes of oil per volume of catalyst per hour. The diluted hydrogen which is introduced at the bottom of the catalyst chamber should be in the range of 10 to 75 per cent hydrogen.

Various valves, pumps, and other conventional equipment necessary for the successful practice of this invention will be familiar to one skilled in the art and have been omitted from these schematic drawings for the sake of clarity.

An example of this invention using the equipment described in Figure 1 is as follows:

Fresh reduced topped crude at 24° API gravity, and a boiling range of 850 to over 1000° F. is charged at the top of the lower section of the catalyst bed which consists of 14 per cent molybdenum disulfide on $\frac{1}{8}'' \times \frac{1}{8}''$ pellets of alumina gel. The lower section of the catalyst bed occupies about 60 per cent of the catalyst chamber. The charge stock is preheated by a heat exchanger and a heater and introduced to the catalyst chamber at 880° F. and at a pressure of 3500 pounds per square inch gauge. Hydrogen of 95 per cent purity consisting of fresh and recycle hydrogen is preheated at 880° F. and introduced at the bottom of the catalyst chamber. The hydrogen and charge stock are contacted countercurrently in the molybdenum disulfide portion of the catalyst bed, where hydrogenolysis takes place. The gas oil and heavier materials pass downward and are completely hydrogenated by the high purity hydrogen introduced at the bottom of the chamber.

The light material and gasoline stock produced by the hydrogenolysis process in the lower portion of the chamber are stripped by the flow of hydrogen upward to the upper section of the catalyst bed consisting of 9 per cent molybdenum dioxide on $\frac{1}{8}'' \times \frac{1}{8}''$ pellets of alumina gel. This portion of the catalyst bed occupies about 40 per cent of the catalyst chamber. Hot 25 per cent hydrogen and 75 per cent inert gas preheated to a temperature of 1100° F. and at a pressure of 3500 pounds per square inch gauge is introduced to the catalyst chamber, just below the upper portion of the catalyst bed, but above the point of introduction of the fresh oil charge, and contacted concurrently with the gasoline and light gases. This upper portion of the catalyst bed is maintained at 975° F. The light materials are reformed in the presence of the diluted hydrogen. Because of the diluted state of the hydrogen the hydrogenation of these light materials and gasoline does not go to completion, leaving a portion of unsaturated compounds valued in motor fuel. At the same time, however, enough hydrogen is present to prevent coking which normally accompanies cracking reactions.

The gasoline and light ends are taken off the top of the catalyst chamber and combined with the gas oil and heavier materials which are taken off at the bottom of the chamber. This mixture is cooled and passed to a separator where the hydrogen is removed for recycle. The remaining materials are separated and fractionated, recovering the gasoline fraction as a product of the process and the gas oil as a by-product of the process. The volume per hour of the charge stock used, having an API gravity of 24° and a boiling range of 850 to 1000+° F., is 1.5 volumes per volume of catalyst per hour. The velocity of the 95 per cent purity hydrogen introduced at the bottom of the catalyst bed is 0.2 linear foot per second through the catalyst voids which amounts to 6000 cubic feet per barrel of charge stock. This velocity should be maintained so that the flow will strip the gasoline and light ends from the gas oil and heavier materials. Hot diluted hydrogen introduced just below the bottom of the top portion of the catalyst bed is introduced at a velocity of 0.31 linear foot per second through the voids which amounts to 4000 cubic feet per barrel of charge stock.

The 400° F. end point gasoline recovered as a product of the process consists of 30.3 liquid volume per cent of the charge stock and has an API gravity of 58° and an ASTM (clear) octane number of 62.3. The hydrogen consumption during the operation is between 1200 and 2500 cubic feet per barrel and averaged about 1550 cubic feet per barrel.

The properties of the gasoline produced may be varied within wide limits by controlling the concentration of the hydrogen in the upper catalyst zone. For example, more hydrogen would produce a gasoline with more saturated components while less hydrogen would provide more unsaturated compounds. Another advantage is the reduction in volume of hydrogen consumed and the use of by-product hydrogen which needs no purification.

Although the process has been described and exemplified in terms of its preferred modifications, it is understood that various changes may be made without departing from the spirit of the process as disclosed or from the scope of the claims.

I claim:

1. A process for catalytic hydrogenolysis of refinery residual oils which comprises contacting a refinery residual oil countercurrently in a first catalyst zone over a suitable hydrogenolysis catalyst with hydrogen of at least 95 per cent purity, said contacting taking place at a temperature between 850 and 950° F. and a pressure between 3000 and 5000 p. s. i. g., separating the gasoline and light hydrocarbons from the gas oil and heavier material by means of gravity and stripping, passing said gasoline and light hydrocarbons to a second catalyst zone, contacting said light hydrocarbons and gasoline concurrently with diluted by-product hydrogen of between 10 and 75 per cent purity introduced at a lower end of the second catalyst zone over a suitable hydrogenolysis catalyst, and thereby reforming and partially hydrogenating said light hydrocarbons and gasoline at a temperature between 950 and 1050° F., recovering said reformed materials from the top of said second catalyst zone, completely saturating said gas oil and heavier materials in said first catalyst zone with the high purity hydrogen, recovering said saturated materials from the bottom of said first catalyst zone, combining said light hydrocarbons and gasoline and said saturated gas oil and heavier materials, cooling said mixture, separating the excess hydrogen for recycle, separating vent gases from said mixture, and recovering by fractionation an improved gasoline containing unsaturated components as a product of the process and a good grade saturated gas oil as a by-product of the process.

2. The process according to claim 1 in which molybdenum disulfide is used as the catalyst in said first catalyst zone, and molybdenum dioxide as the catalyst in said second catalyst zone.

3. A process for catalytic hydrogenolysis of refinery residual oils which comprises contacting a refinery residual oil countercurrently in a first catalyst zone over a suitable hydrogenolysis catalyst with hydrogen of at least 95 per cent purity, said contacting taking place at a temperature between 850 and 950° F. and a pressure between 3000 and 5000 p. s. i. g., separating the gasoline and light hydrocarbons from the gas oil and heavier material by means of gravity and stripping, passing said gasoline and light hydrocarbons to a second catalyst zone, contacting said light hydrocarbons and gasoline concurrently with diluted by-product hydrogen of between 10 and 75 per cent purity introduced at a lower end of the second catalyst zone over a suitable hydrogenolysis catalyst, and thereby reforming and partially hydrogenating said light hydrocarbons and gasoline at a temperature between 950 and 1050° F., recovering said reformed materials from the top of said second catalyst zone, completely saturating said gas oil and heavier materials in said first catalyst zone with the high purity hydrogen, recovering said saturated materials from the bottom of said first catalyst zone, fractionating separately material recovered from the top of said second catalyst zone thereby recovering an improved gasoline, and fractionating separately material recovered from the bottom of said first catalyst zone thereby recovering a good grade gas oil as a by-product of the process.

4. A process of manufacturing an improved gasoline and a good grade gas oil from refinery residual oils by catalytic hydrogenolysis, which comprises introducing a refinery residual oil at a temperature in the range of 850 to 950° F. and a pressure in the range of 3000 to 5000 p. s. i. g. to the top of a bed of suitable hydrogenolysis catalyst in the lower portion of a catalyst chamber at a rate of 0.5 to 2 liquid volumes per volume of catalyst per hour, contacting said oil with hot hydrogen of relatively high purity introduced at the bottom of said catalyst chamber at a rate through the catalyst voids in the range of 0.1 to 0.25 foot per second, cracking and hydrogenating said oil as it passes downwardly through said catalyst bed and sweeping the lighter hydrocarbons boiling in and below the gasoline range produced thereby upwardly through said catalyst by means of said hydrogen, contacting said lighter hydrocarbons with a second bed of hydrogenolysis catalyst placed above the first bed thereof and within the same chamber such that there is free communication between the two beds of catalyst, reforming and partially hydrogenating the hydrocarbons boiling in and below the gasoline range at a temperature in the range of 950 to 1050° F. and a pressure in the range of 3000 to 5000 p. s. i. g. in the presence of hot diluted hydrogen of 10 to 75 per cent purity introduced at the bottom of said second catalyst bed and passing concurrently therethrough with said hydrocarbons and gasoline, recovering from the bottom of said catalyst chamber a treated oil and from the top of said chamber hydrocarbons boiling in and below the gasoline range.

LUKE B. GOODSON.

REFERENCES CITED

The following references are of record in the file of this patent:

UNITED STATES PATENTS

| Number | Name | Date |
| --- | --- | --- |
| 1,955,297 | Jennings | Apr. 17, 1934 |
| 1,962,792 | Van Voorhees et al. | June 12, 1934 |
| 2,321,841 | Mekler et al. | June 15, 1943 |
| 2,335,610 | Plummer | Nov. 30, 1943 |
| 2,374,095 | Helmers | Apr. 17, 1945 |